E. PEREMI.
TAPPING DEVICE.
APPLICATION FILED SEPT. 23, 1915.
1,180,074.
Patented Apr. 18, 1916.
2 SHEETS—SHEET 1.
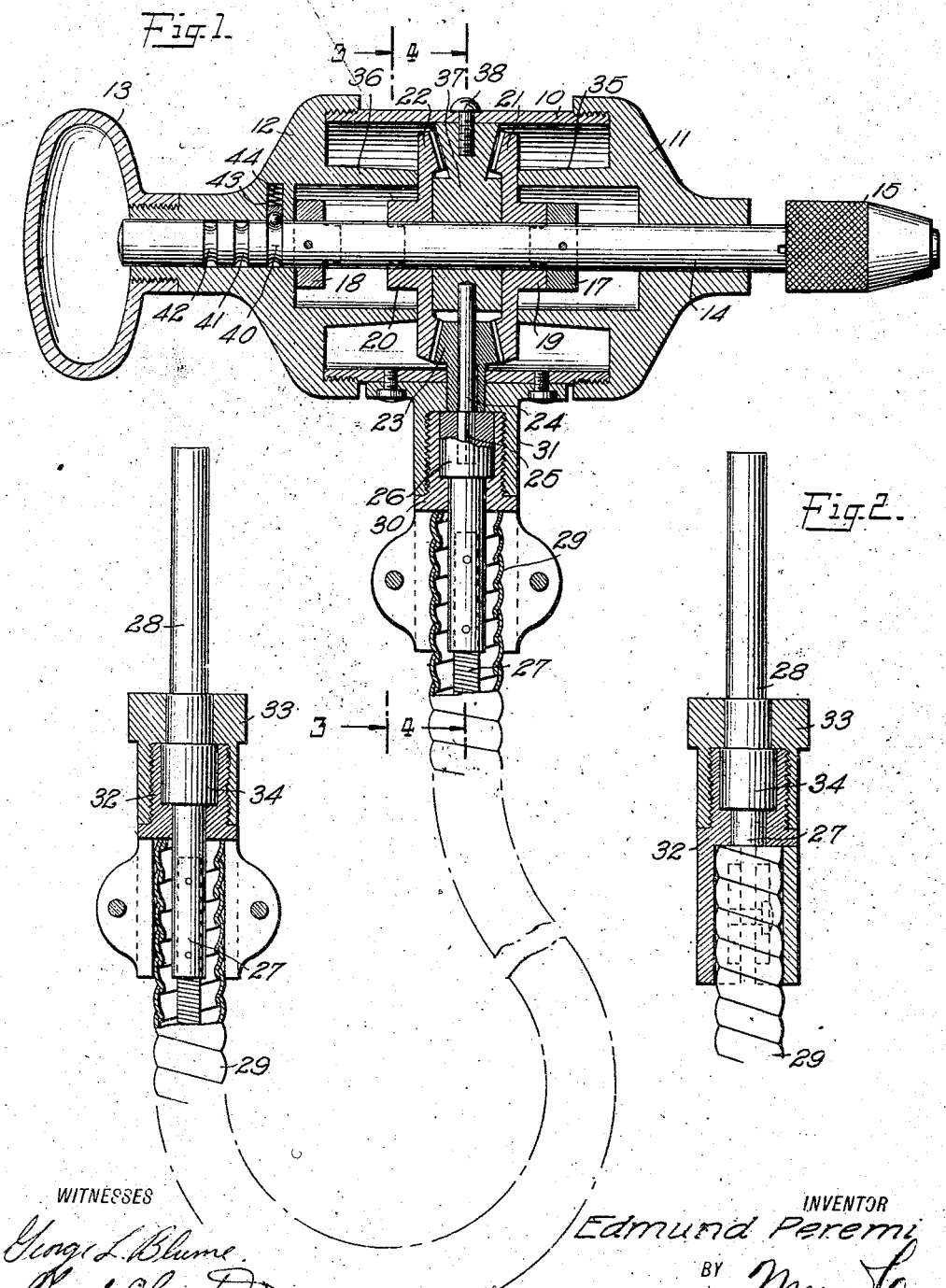
WITNESSES
INVENTOR
Edmund Peremi
BY 
ATTORNEYS

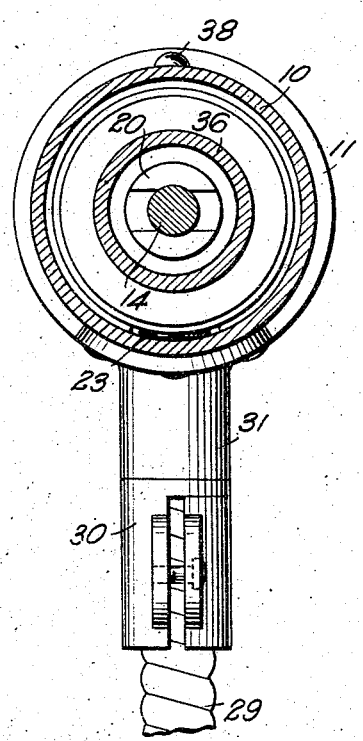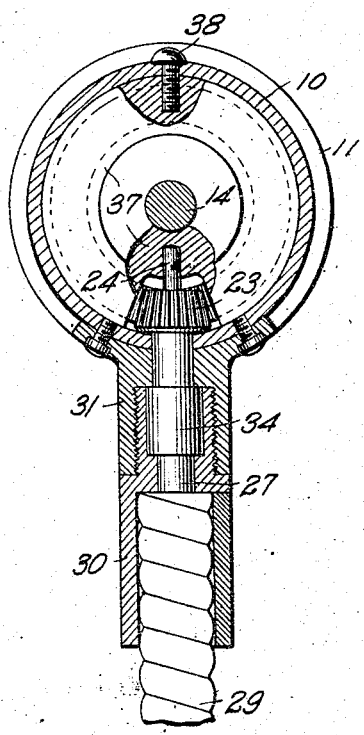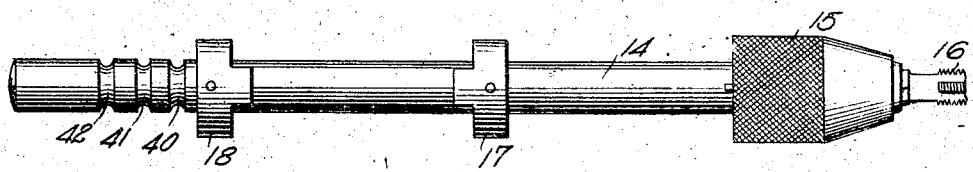

UNITED STATES PATENT OFFICE.

EDMUND PEREMI, OF NEW YORK, N. Y.

TAPPING DEVICE.

1,180,074. Specification of Letters Patent. Patented Apr. 18, 1916.

Application filed September 23, 1915. Serial No. 52,166.

*To all whom it may concern:*

Be it known that I, EDMUND PEREMI, a citizen of the United States, and a resident of the city of New York, borough of Brooklyn, in the county of Kings and State of New York, have invented a new and Improved Tapping Device, of which the following is a full, clear, and exact description.

The invention relates to hand tools and its object is to provide a new and improved tapping device for the use of mechanics and arranged to permit the convenient and quick tapping of a hole.

In order to accomplish the desired result, use is made of a casing provided at one end with a handle, a spindle mounted to turn and to slide in the said casing and having one end extending beyond the other end of the said casing, a chuck for holding a tap and secured to the said outer end of the spindle, spaced clutch members secured on the said spindle within the casing, and driven clutch members mounted to rotate loosely on the spindle within the casing intermediate the said spindle clutch members, the said driven clutch members rotating in opposite directions and being adapted to be engaged by the said spindle clutch members on shifting the spindle first in one direction, then in the opposite direction.

A practical embodiment of the invention is represented in the accompanying drawings forming a part of this specification, in which similar characters of reference indicate corresponding parts in all the views.

Figure 1 is a longitudinal central section of the tapping device; Fig. 2 is a cross section of the terminal of the fixed driving shaft; Fig. 3 is a cross section of the tapping device on the line 3—3 of Fig. 1; Fig. 4 is a similar view of the same on the line 4—4 of Fig. 1; and Fig. 5 is a side elevation of the spindle provided with the chuck and spindle clutch members.

The tapping device is mounted on a casing 10, preferably made cylindrical and provided at its ends with heads 11 and 12, of which the head 12 is provided with a hollow handle 13. In the heads 11 and 12 is mounted to turn and to slide a spindle 14 extending through the head 11 to the outside, the spindle carrying at its outer end a chuck 15 for holding a tap 16, as indicated in Fig. 5. On the spindle 14 within the casing 10 are secured spaced clutch members 17 and 18 adapted to be moved into engagement with driven clutch members 19, 20 formed or secured on the hubs of bevel gear wheels 21 and 22 mounted to rotate loosely on the spindle 14 intermediate the clutch members 17 and 18. The bevel gear wheels 21 and 22 have their teeth facing each other and the said bevel gear wheels 21 and 22 are in mesh with the opposite sides of a bevel pinion 23 having its shaft 24 provided with a polygonal terminal 25 engaging a socket 26 on one end of a flexible drive shaft 27 adapted to be connected at its other end 28 with a motor for rotating the shaft 27. The rotary motion of the shaft 27 is transmitted by the shaft 24 to the bevel pinion 23, which latter rotates the bevel gear wheels 21 and 22 in opposite directions.

The flexible shaft 27 extends through a flexible casing 29 provided at one end with a bearing 30 in which rotates the socket 26 and which screws into a nipple 31 attached to the casing 10. The other end of the housing 29 is provided with a bearing 32 for the enlarged end 34 of the shaft 28 and on the bearing 32 screws a cap 33 against the collar 34 to hold the shaft 27 in position in the bearing 32.

In order to prevent the bevel gear wheels 21 and 22 from shifting within the casing 10, the heads 11 and 12 are provided with inwardly extending annular flanges 35 and 36 against which abut the backs of the bevel gear wheels 21 and 22. In order to prevent binding of the bevel gear wheels 21 and 22 on the pinion 23, use is made of a spacing block 37 fastened by screws 38 to the casing 10. The faces of the gear wheels 21 and 22 abut against the sides of the block 37 and through the latter extends the spindle 14 thus providing a central bearing for the spindle 14.

The spindle clutch members 17, 18 are spaced apart relatively to the clutch members 19 and 20 so that in one position of the spindle 14 both clutch members are out of mesh with their driven clutch members 19 and 20. When it is desired to tap a hole the tap 16 is engaged with the hole and then the operator presses on the handle 13 to shift the casing 10 on the spindle 14 toward the chuck 15 whereby the clutch member 17 is moved into engagement with the clutch member 19 and as the latter rotates continually a rotary motion is given to the spindle 14 to cause the tap 16 to tap the hole. When this has been done, the operator pulls on the handle 13 so that the casing 10 is shifted lengthwise on the spindle 14 away from the chuck 15 whereby the clutch member 17 is moved out of engagement with the clutch member 19 and the spindle 14 comes to rest. On a further movement of the casing 10 to the left, the clutch member 18 moves into engagement with the clutch member 20 so that the spindle 14 is now rotated in an opposite direction, and the tap 16 unscrews itself out of the tap hole.

In order to hold the spindle 14 against accidental movement when in either a neutral, forward or reversed position, use is made of three annular grooves 40, 41 and 42, formed on the spindle, preferably near the end extending through the head 12. In the head 12 is mounted a pawl 43 pressed on by a latch spring 44 to engage the pawl with one of the said grooves 40, 41 and 42 according to the position of the spindle, to prevent accidental shifting of the same. It is understood that the pawl 43 readily yields to the pressure exerted against the spindle 14 in a lengthwise direction, as previously mentioned, to allow shifting of the spindle 14 in the heads 11 and 12 of the casing 10.

The tapping device shown and described is very simple and durable in construction and can be readily carried in the hand by an operator for conveniently and quickly tapping a hole and running the tap out of the tapped hole. The compact form of the device permits its use in places where wrenches and like tools employed for turning a tap cannot well be employed.

Having thus described my invention, I claim as new and desire to secure by Letters Patent:

1. In a hand tapping tool, the combination of a casing having removable heads, one of which is provided with a handle, a spindle mounted to rotate and to slide in the said casing, one end of the spindle extending through a casing head to the outside of the casing, a chuck on the said outer end of the spindle and adapted to carry a tap, spaced clutch members on the said spindle within the casing, beveled gear wheels mounted loosely on the said spindle within the casing intermediate the said spindle clutch members, the hub of the said gear wheels being provided with clutch members adapted to be engaged by the said spindle clutch members, a pinion in mesh with both gear wheels and journaled in the said casing, a flexible shaft, a coupling connecting the said flexible shaft with the said pinion, a bearing for the said flexible shaft and detachably connected with the said casing, and means for locking the spindle against accidental movement.

2. In a hand tapping tool, the combination of a casing having heads provided with flanges extending into the casing, the inner ends of the flanges being spaced apart, a handle on one of the heads of the casing, a spindle mounted to rotate and to slide in the said casing, one end of the spindle extending to the outside of the casing, a chuck on the said outer end of the spindle and adapted to carry a tap, spaced clutch members on the said spindle within the casing, gear wheels loose on the spindle within the casing between the spindle clutch members and provided with clutch members adapted to be engaged by said spindle clutch members, the said gear wheels abutting against the inner ends of the said flanges to hold the gear wheels against shifting, a bevel pinion journaled in the casing and meshing with the gear wheels, and a driven shaft connected with the pinion.

3. In a hand tapping tool, the combination of a casing having heads provided with flanges extending into the casing, the inner ends of the flanges being spaced apart, a spindle mounted to rotate and to slide lengthwise in the said heads, a chuck on one outer end of the spindle for holding a tap, bevel gear wheels mounted to rotate loosely on the said spindle and having their backs abutting against the inner ends of the said flanges, the said gear wheels being provided with clutch members, spindle clutch members secured on the said spindle and adapted to move into engagement with the said bevel gear wheel clutch members, a bevel pinion in mesh with both bevel gear wheels, a bearing block attached to the casing and through which extends the said shaft, the faces of the bevel gear wheels abutting against the said bearing block, a shaft for the said bevel pinion and having one end journaled in the said bearing block, and a driven shaft connected with the said pinion shaft.

4. In a hand tapping tool, the combination of a casing having heads provided with flanges extending into the casing, the inner ends of the flanges being spaced apart, a spindle mounted to rotate and to slide lengthwise in the said heads, a chuck on one outer end of the spindle for holding a tap, bevel gear wheels mounted to rotate loosely on the said spindle and having their backs abutting against the inner ends of the said flanges, the said gear wheels being provided with clutch members, spindle clutch members secured on the said spindle and adapted to move into engagement with the said bevel gear wheel clutch members, a bevel pinion in mesh with both bevel gear wheels, a bearing block attached to the casing and through which extends the said shaft, the faces of the said bevel gear wheels abutting against the said bearing block, a shaft for the said bevel pinion and having one end journaled in the said bearing block, the other end of the pinion shaft being polygonal, a driven shaft having at one end a socket engaged by the said polygonal end of the pinion shaft, and a bearing for the said socket end of the driven shaft and attached to the said casing.

In testimony whereof I have signed my name to this specification in the presence of two subscribing witnesses.

EDMUND PEREMI.

Witnesses:
  THEO. G. HOSTER,
  PHILIP D. ROLLHAUS.